(12) United States Patent
Desport

(10) Patent No.: US 7,809,508 B2
(45) Date of Patent: Oct. 5, 2010

(54) STANDOFF CORRECTION FOR LWD DENSITY MEASUREMENT

(75) Inventor: Olivier Desport, Toulon (FR)

(73) Assignee: Schlumberger Technology Corporation, Houston, TX (US)

( * ) Notice: Subject to any disclaimer, the term of this patent is extended or adjusted under 35 U.S.C. 154(b) by 608 days.

(21) Appl. No.: 11/764,562

(22) Filed: Jun. 18, 2007

(65) Prior Publication Data
US 2008/0023628 A1    Jan. 31, 2008

Related U.S. Application Data

(60) Provisional application No. 60/814,859, filed on Jun. 19, 2006.

(51) Int. Cl.
G01V 5/04 (2006.01)
G01V 1/40 (2006.01)

(52) U.S. Cl. .............. 702/11; 702/9; 702/85; 73/152.05; 250/264

(58) Field of Classification Search ............... 702/6–13, 702/85, 86, 137; 73/152.01, 152.02, 152.05–152.07; 250/264
See application file for complete search history.

(56) References Cited

U.S. PATENT DOCUMENTS 4,297,575 A    10/1981  Smith, Jr. et al.
5,473,158 A *  12/1995  Holenka et al. ............. 250/254
6,590,202 B2 *  7/2003  Mickael .................... 250/269.2
2004/0021066 A1 *  2/2004  Schneider et al. ........... 250/266
2004/0200274 A1 * 10/2004  Moake et al. ............ 73/152.05

OTHER PUBLICATIONS

"SlimXtreme: The slim logging solution for hostile environments"; Schlumberger, SMP5865, Apr. 2002, 4 pages.
Curtis, C. et al.; "Heavy-Oil Reservoirs"; Schlumberger; Oilfield Review, Autumn 2002; pp. 30-51.
Bosworth, S. et al.; "Key Issues in Multilateral Technology"; Schlumberger; Oilfield Review, Winter 1998; pp. 14-28.
Fraija, J. et al.; "New Aspects of Multilateral Well Construction"; Schlumberger; Oilfield Review, Autumn 2002; pp. 52-69.
International Search Report dated Mar. 5, 2008 (3 pages).

* cited by examiner

*Primary Examiner*—Manuel L Barbee
(74) *Attorney, Agent, or Firm*—Osha Liang LLP

(57) ABSTRACT

A method for conducting density measurements in downhole environments corrects for high standoff, by adding a second correction term to the spine and rib method. This second term is a correction based on an apparent standoff estimated using the photo electric effect of the mud. This correction is term depends on the mud properties, both in terms of apparent standoff and correction and therefore requires property calibration for each well. The calibration can be done using the azimuthal information available with LWD tool when the tool is turning. At each depth in homogeneous formation, there can be a succession of density measurements with various tool standoff when the tool is not centered in the borehole. All this information is used to build up a standoff correction fitting perfectly the mud properties.

18 Claims, 7 Drawing Sheets

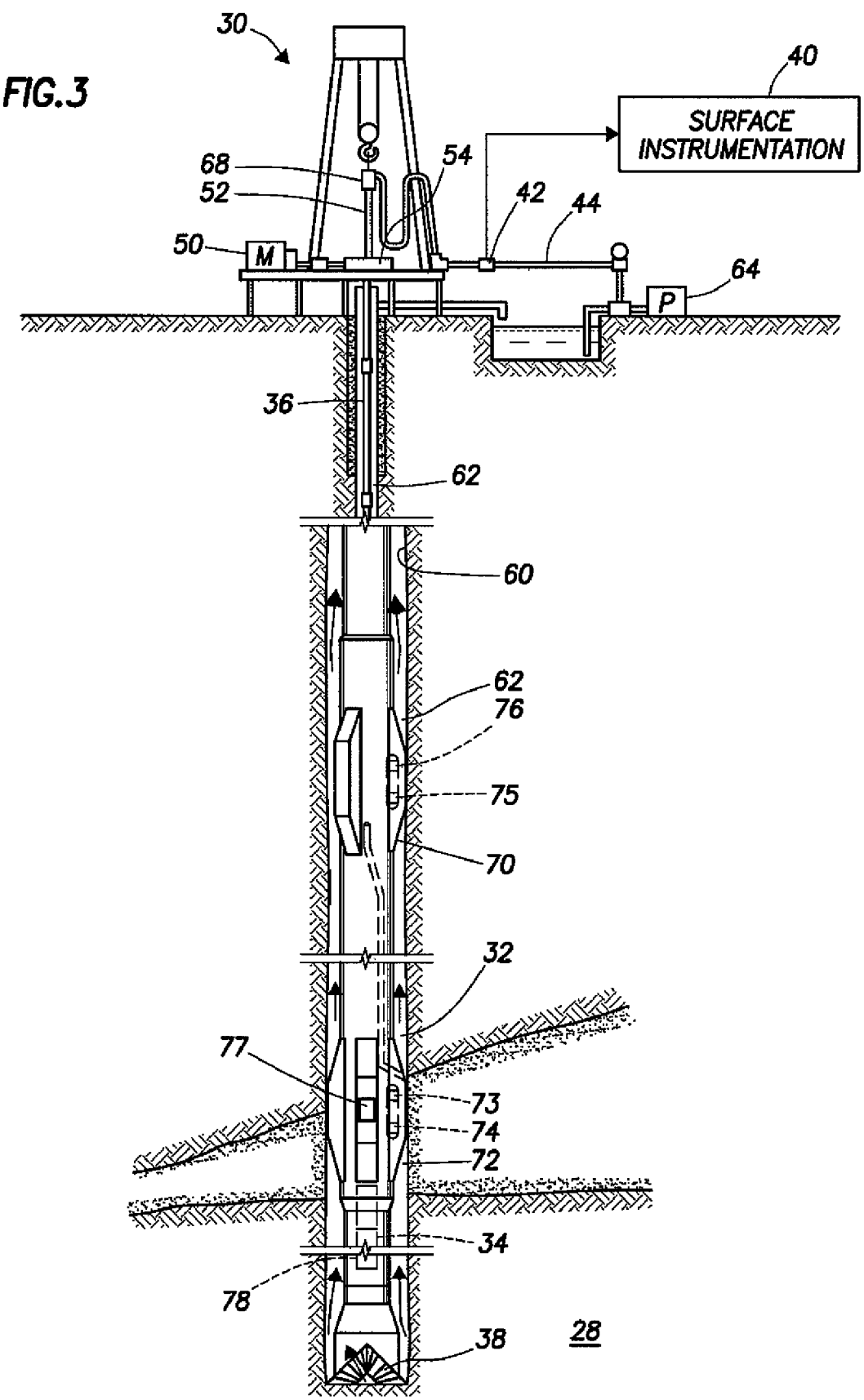

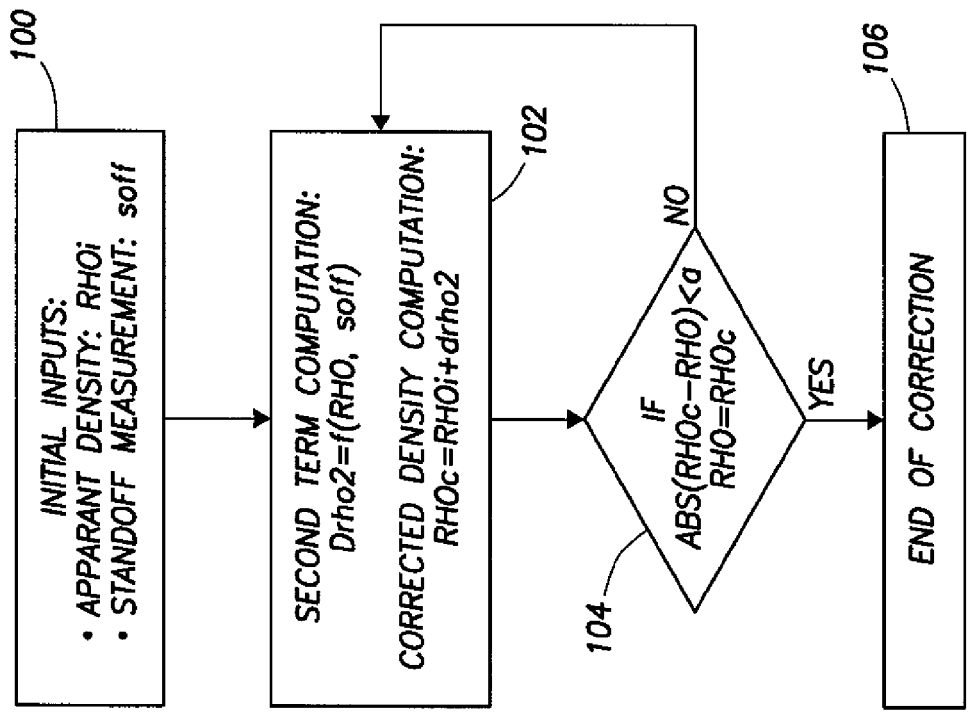

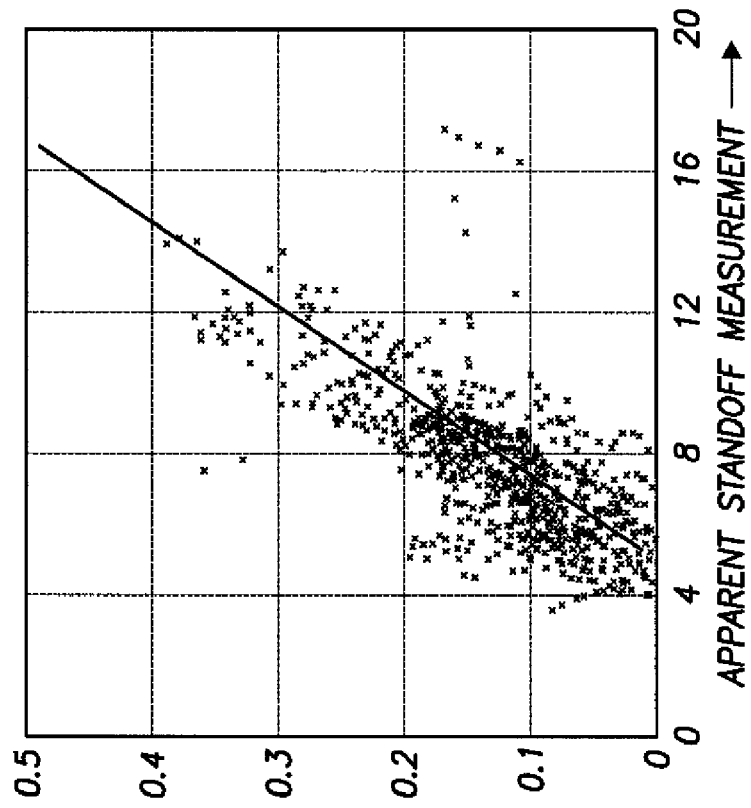
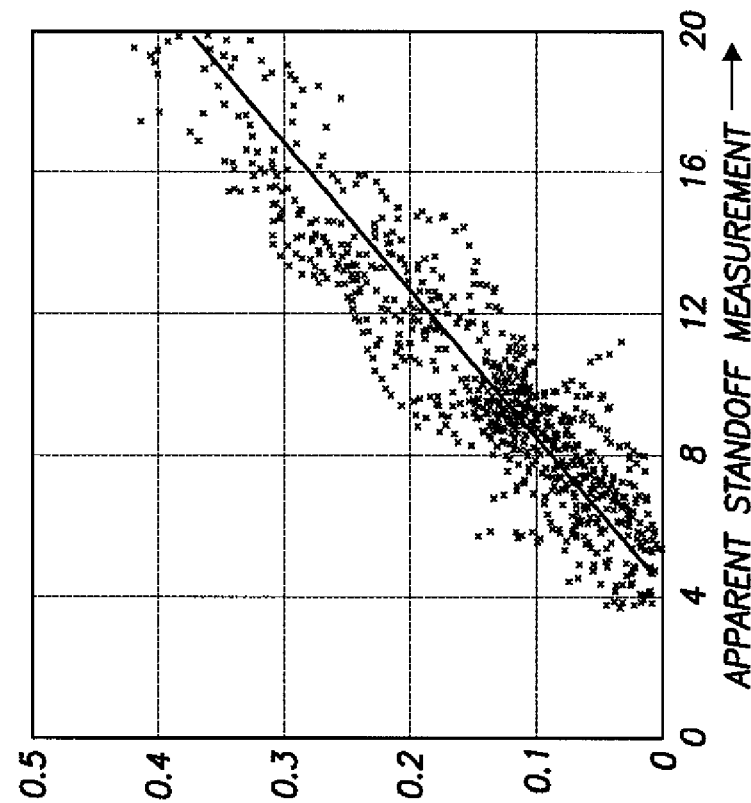

STANDOFF CORRECTION FOR LWD DENSITY MEASUREMENT

FIELD OF THE INVENTION

The present invention relates to a method for correcting tool standoff effects on a Logging While Drilling (LWD) density measurement and in particular to an improved method for correcting tool standoff in LWD measurements by adding a second correction term to the spine and rib graph. The second term being a correction based on apparent standoff estimated using the pe effect of the drilling mud.

BACKGROUND OF THE INVENTION

Formation density measurements are typically used to calculate formation porosity. Conventional density logging (wireline or measurement while drilling) is based on the detection of attenuated gamma rays emitted from a radioactive source. After gamma rays from the source penetrate the borehole and formation, the gamma ray detectors count a fraction of the scattered gamma rays. The tool configuration usually includes the radioactive source and the dual detectors spaced at different lengths from the source. The scattering, which the gamma rays experience after emission from the source and prior to detection, is related to formation bulk density. More specifically, the number of gamma rays scattered is exponentially related to the formation electron density. Since nuclear emission from a radioactive source is random but probabilistic in occurrence, the average count rate must be taken over a period of time long enough to obtain a number of counts sufficient for a statistically accurate count rate measurement.

In measurement while drilling (MWD) tools used for making formation density measurements density tool electronics and the gamma detectors (both the short space and long space detector) may be disposed in a stabilizer blade affixed to a drill collar in a lower portion of the drill string near the drill bit. The stabilizer blade displaces drilling mud in the annulus of the borehole and places low density windows, installed radially outward of the radiation source and detectors, in contact with the earth formation. During rotary drilling, the MWD tool may typically rotate at a rate of as much as one or two revolutions per second. To account for statistics, data sampling times in the MWD tool are longer than those used with wireline density tools, and are typically in the range of about 30 seconds.

Although these measurements are taken in both wireline and MWD applications, performing porosity measurements and density measurements while drilling results in certain advantages over conventional wireline porosity and density measurements. Longer sample periods due to the slower nature of the drilling process reduce the statistical variations and uncertainty in measuring while drilling porosity and density measurements. Many of the borehole effects that perturb wireline measurements of porosity or density are reduced because the drill collar substantially fills the borehole while drilling. Also, formation effects, lithology and salinity changes under drilling conditions are comparable to or less than those for an open hole wireline measurement which may occur hours or even days after the borehole is drilled. However, in MWD applications, the washing action of drilling fluid during drilling operations can produce variations in borehole size. Increased variations in borehole diameter are called washouts. Separation or "standoff", of the tool from the borehole wall causes measured data perturbations. The occurrence of washouts exacerbates the standoff effect.

Two basic conventional techniques are used to process dual detector count rate data. These techniques are commonly referred to as the "ratio" and "spine and rib" methods. The ratio method utilizes the ratio of detector responses to determine the parameter of interest. If the logging tool or sonde is calibrated in a reference "standard" well, and if the count rates produced by the two detectors are affected by the same proportion in non-standard environmental conditions, the ratio of count rates will tend to cancel the adverse effects of the non-standard environmental conditions. This technique is used in dual thermal neutron porosity logging. If, however, non-standard environmental conditions vary the count rates in each detector by different proportions, as when variations in borehole diameter vary the detector count rates, the spine and rib method may be more effective in determining borehole and environmental characteristics. Spine and rib analysis may be performed by plotting values obtained from the respective radiation detectors operating in the non-standard condition on a graph of values obtained from the sonde operating in known reference standard boreholes. The data obtained from the reference standard is referred to as the "spine", whereas the effect of non-standard environmental conditions is reflected in spine-intersecting lines referred to as "ribs". The point of intersection of a rib with the spine provides an indication of a corrected logging datum, for example, formation porosity.

Formation measurements such as the formation density are affected by tool standoff. As a result, is it necessary to correct this formation measurement. When the tool standoff gets too high, the classical spine and rib method is not enough to correct properly the density. This standoff condition exists in wireline tools but is even more severe with LWD tools where the standoff is much higher than with pad tools. During the density measurement process, it is necessary to correct the measurement in view of the affect of the tool standoff.

As mentioned, density correction is done using the apparent response of two detectors with different spacing to the source and therefore different sensitivity to standoff. By combining those two apparent densities with the spine and rib correction method, it is possible to correct the long spacing reading for the effect of the standoff This robust method works well for small standoff but is severely inadequate when the tool standoff increases. Two main reasons contribute to this inadequacy:

The rib angle or shape is mud dependent and therefore correction errors get large when standoff increases When short spacing saturates (reading mud) the method cannot work.

These limitations are not normally an issue with a pad tool such as a wireline tool, but with LWD tools, the standoffs encountered are much higher and the limitations of the spine and rib method can be a concern in large sections of the well.

There remains a need for a method for taking formation density measurements while drilling that corrects the measurement for the affects of substantial tool standoff.

SUMMARY OF THE INVENTION

The present invention provides a method for correcting formation density measurements taken in downhole environments and especially in environments in which there is a high tool standoff. The data for these density measurements are taken with logging while drilling tools during the drilling operations.

One aspect of this invention is to provide for an improved standoff correction method for density measurements in high tool standoff environments. In order to correct for high standoff, the method of the present invention combines a second correction term to the spine and rib method. This second correction term is based on an apparent density and tool standoff estimated using the photo electric (PE) effect of the mud. This second correction is term depends on the mud properties, both in terms of apparent formation density and a tool standoff and therefore requires property calibration for each well. The calibration can be done using the azimuthal information available with the LWD tool when the tool is turning. At each depth in a homogeneous formation there can be a succession of formation density measurements with various tool standoff when the tool is not centered in the borehole. All this information is used to build up a standoff correction fitting perfectly the mud properties.

A second aspect of the present invention is to provide a method for correcting formation density measurements affected by high tool standoff. In this method, initial formation density measurements are taken of a formation at various formation depths. From these measurements, apparent formation densities are calculated for different borehole quadrants at these multiple borehole depths. The apparent density from the quadrant with the smallest tool standoff is used to determine the initial formation density. A density correction term is calculated from the apparent formation density and the tool standoff measurement. A corrected formation density is then calculated from the initial formation density and the second correction term, Another aspect of the invention is to build a database of formation density measurements at different depths and different tool standoffs. This database has different density correction terms for various formation densities and estimated standoff measurements. This database can be used as a characterization tool to derive a continuous correction function to compute the density correction term (also referred to as the second correction term). By doing so, one is ensured to have a characterization perfectly fitted to the mud properties, which allow the correction to remain very stable for high standoff areas. As the second term correction is computed using formation density as one of the input, the density correction processing can be an iterative process based on the information at various formation depths.

DESCRIPTION OF THE DRAWINGS

FIG. 3 is an illustration of typical rotary drilling rig system for performing measurement while drilling operations and collecting formation density data.

FIG. 6 is a cross-section of the density LWD tool showing borehole quadrants and tool standoff when the tool is not centered in the borehole, FIGS. 7a and 7b are cross plots of the correction data for two different density slices.

FIG. 8 is a flow diagram of the correction computation when an iterative processing is required.

DETAILED DESCRIPTION OF THE INVENTION INCLUDING EXAMPLES AND DRAWINGS

Figure 1:
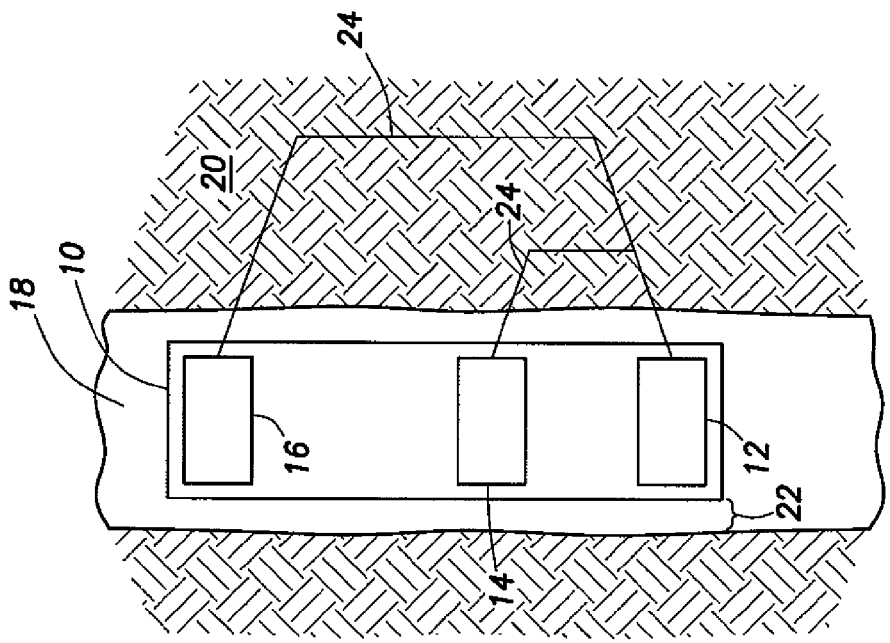
FIG. 1 is an example of the dual detector configuration used to measurement formation characteristics such as formation density in a borehole having a standard diameter.

FIG. 1 shows the basic configuration for making formation density measurements using the dual detectors concept. As shown, a measurement tool 10 comprises a source 12, a near detector 14 and a far detector 16. The tool is positioned in a borehole 18 that penetrates a formation 20. The distance 22 between the edge of the formation, the formation wall, and the source and detectors in the tool is the tool standoff. In the convention density measurement of FIG. 1, rays 24 are emitted from the source 12 and travel through the formation 20. The rays are eventually detected at both the near detector 14 and far detector 16. As mentioned, during the density measurement process, it is necessary to correct the measurement for the affects of tool standoff. One technique used to perform this correction is the spine and rib method.

Figure 2:
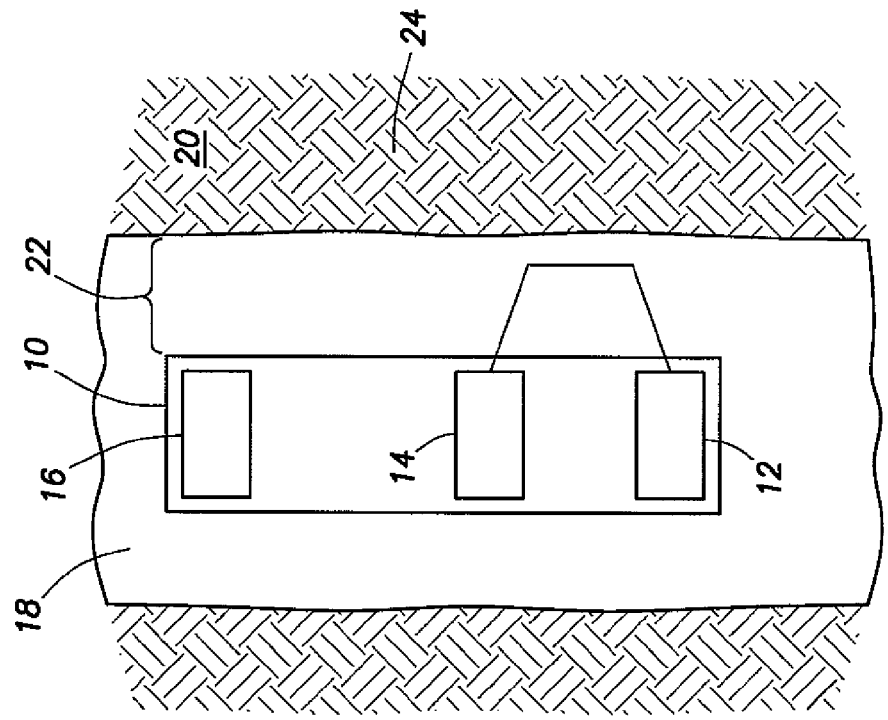
FIG. 2 is an example of the dual detector configuration used to measurement formation characteristics such as formation density in a borehole having a large diameter and a high tool standoff.

Referring to FIG. 2, shown is a configuration with a substantial tool standoff 22. In this situation, the rays 24 emitted from the source may only travel through the mud materials in the borehole 18 and not even or barely travel into the formation before being detected at the near detector 14. For this situation, the spine and rib approach for correcting for standoff is inadequate because there is no reliable density measurement from the near detector 14.

FIG. 3 illustrates a typical rotary drilling rig system 30 having apparatus for measurement while drilling of formation porosity, formation bulk density, formation photoelectric absorption coefficient, and borehole diameter associated therewith. Instruments placed in drill collar 32 conduct downhole measurements. Such measurements may be stored in memory apparatus of the downhole instruments, or may be telemetered to the surface via conventional measuring-while-drilling telemetering apparatus and methods. For that purpose, an MWD tool sub, schematically illustrated as data signaling module 34, receives signals from instruments of collar 32, and telemeters or transmits them via the mud path of drill string 36 and ultimately to surface instrumentation 40 via a pressure sensor 42 in stand pipe 44.

Drilling rig 30 includes a motor 50, which turns a kelly 52 by means of a rotary table 54. A drill string 36 includes sections of drill pipe connected end-to-end to the kelly and turned thereby. A drill collar 32 as well as other conventional collars and other MWD tools, are attached to the drilling string 36. Such collars and tools form a bottom hole drilling assembly between the drill string 36 and the drilling bit 38.

As the drill string 36 and the bottom hole assembly turn, the drill bit 38 bores the borehole 60 through earth formations 28. An annulus 62 is defined as the portion of the borehole 60 between the outside of the drill string 36 including the bottom hole assembly and the earth formations 28.

Drilling fluid or "mud" is forced by pump 64 from mud pit 66 via stand pipe 44 and revolving injector head 68 through the hollow center of kelly 52 and drill string 36 to the bit 38. The mud acts to lubricate drill bit 38 and to carry borehole cuttings upwardly to the surface via annulus 62. The mud is delivered to mud pit 66 where it is separated from borehole cuttings and the like, degassed, and returned for application again to the drill string.

The drill collar 32 is an important component of an improved MWD nuclear logging system. A drill collar 32 can include porosity measurement section 70 at the upper end of the collar and a gamma-gamma density section 72 at the lower end. Each of these sections 70 and 72 can contain the previously described dual detector configuration.

As shown in FIGS. 1 and 2, gamma rays travel through drilling fluid and into the formation and then back through the drilling fluid into the borehole. This drilling fluid affects the density measurement. Knowledge of gamma ray attenuation caused by the drilling fluid existing between the gamma ray detectors and the formation wall is desirable for generating an improved formation gamma density determination which is compensated for standoff or cave effects. In making a drilling fluid attenuation correction to gamma ray detection data, the difference between formation density calculated from the far detector 73 and that calculated from the near detector 74 is generated. This difference is functionally related to an increment, which should be added to the density determined from the far detector. Such increment is a function of the standoff of the tool 32 from the borehole wall and the gamma ray absorption property of the drilling fluid density being used and its photoelectric adsorption coefficient. Thus, knowledge of the density and the photoelectric adsorption coefficient of the drilling fluid in addition to the tool standoff are desirable to make an appropriate correction to the determined formation density.

In a similar manner, near and far detector data from radiation sensors 75 and 76 of the neutron porosity section are affected by the amount of drilling fluid existing between such detectors and the formation wall. Measurement of borehole diameter by means of sensors 77 as described above provides the essential data in the determination of such volume of drilling fluid between the formation wall and the detectors.

Accordingly, near and far neutron porosity data from detectors 75 and 76 and borehole diameter data from ultrasonic sensors 77 are collected in electronic cartridge 78 as a function of borehole depth or position. Such data may be stored and later retrieved when tool 32 is returned from the borehole to the well surface. Preferably, however, such data is transmitted to the surface via data signaling module 34 in the form of acoustic or pressure pulses via the drilling fluid within drill string 36. Such pulses are sensed by sensor 42 in standpipe 44 and the data is collected in surface instrumentation unit 40 of FIG. 3. Once the data is collected in the surface instrumentation 40, density correction techniques, such as the rib and spine method are applied to the data to process the data. This process includes correcting the data for tool standoff affects.

Figure 4:
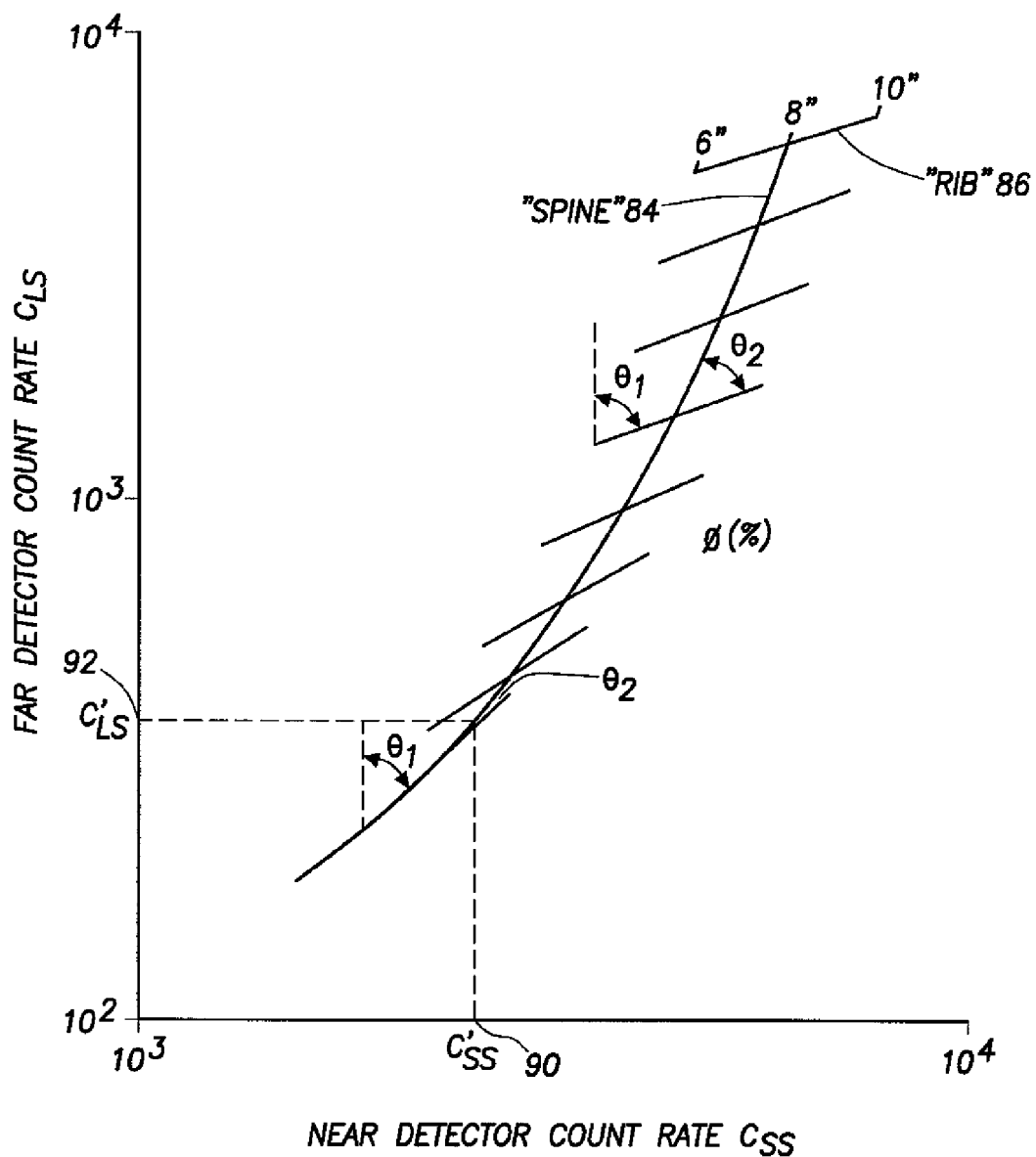
FIG. 4 is an illustration of a spine and rib chart used in correcting formation density measurements for tool standoff affects.

FIG. 4 is an illustration of a conventional spine and rib graph used in processing formation data, Shown is a representation of the graphical relationship of a borehole environmental condition, (borehole diameter) to formation porosity (.phi.) as determined from a two-detector compensated log. The "spine" 84 is comprised of a series of paired values C.sub.SS and C.sub.LS obtained from reference "standard" 8-inch borehole. Traversing the spine are a plurality of short graphs or lines, which are formed from paired count rate values C.sub.SS and C.sub.LS corresponding to boreholes in which the diameters range from 6 to 10 inches. These spine-traversing lines are referred to as "ribs". The ribs 86 provide a correction for borehole diameter deviations from the normal borehole that permit the determination of formation density. It will be apparent that the correction may be made without directly measuring the diameter of the borehole at the location being logged. For example, the diameter may be indirectly approximated from the values C.sub.SS and C.sub.LS. Similar graphical relationships also exist for the determination of formation porosity, casing and cement thickness, borehole salinity, tool standoff, mudcake thickness and mud weight.

Referring to FIG. 4, two relevant angles may be determined for each spine/rib graphical relationship. An angle theta.sub.1 indicates the angle of the rib 86 relative to the vertical axis of the graph. An angle theta.sub.2 indicates the acute angle between the rib 86 and a tangent to the spine at the point of intersection between the rib and spine. It will readily be observed that for particular curved spine and rib configurations the rib and spine may touch at more than one point. In these situations, an ambiguity is introduced into the analysis.

When .theta.sub.1 is approximately 45 degrees, the ratio method is applicable for determining the corrected value of bulk density or porosity (.phi.) because the rib graph indicates that a variation in borehole diameter affects the count rates in both detectors by about the same proportion. As the angle .theta.sub.1 deviates from 45.degree, increasing amounts of correction will be required for the parameters determined by the ratio method. For appreciable deviation of .theta.sub.1 from 45.degree, the spine/rib method is preferable if and only if .theta.sub.2 does not approach 0 degrees. When .theta.sub.2 approximately equals 0 degrees, the rib may not be distinguishable from the spine and the spine/rib method is not applicable. Threshold count rate values C'.sub.SS 90, C'.sub.LS 92, which represent count rates below which theta.sub.2 is approximately 0 degrees, are depicted on the graph. When count rates C.sub.SS and C.sub.LS are both less than C'.sub.SS 90 and C'.sub.LS 92, respectively, the ratio method must be used to determine the borehole size correction.

Figure 5B:
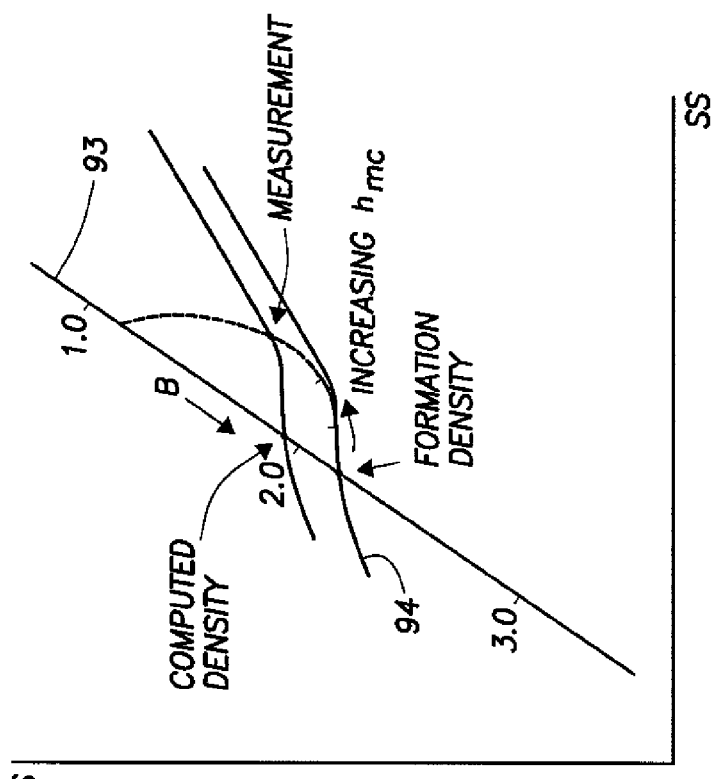
FIGS. 5a and 5b are illustrations of a spine and rib plots used to measure formation density.
Figure 5A:
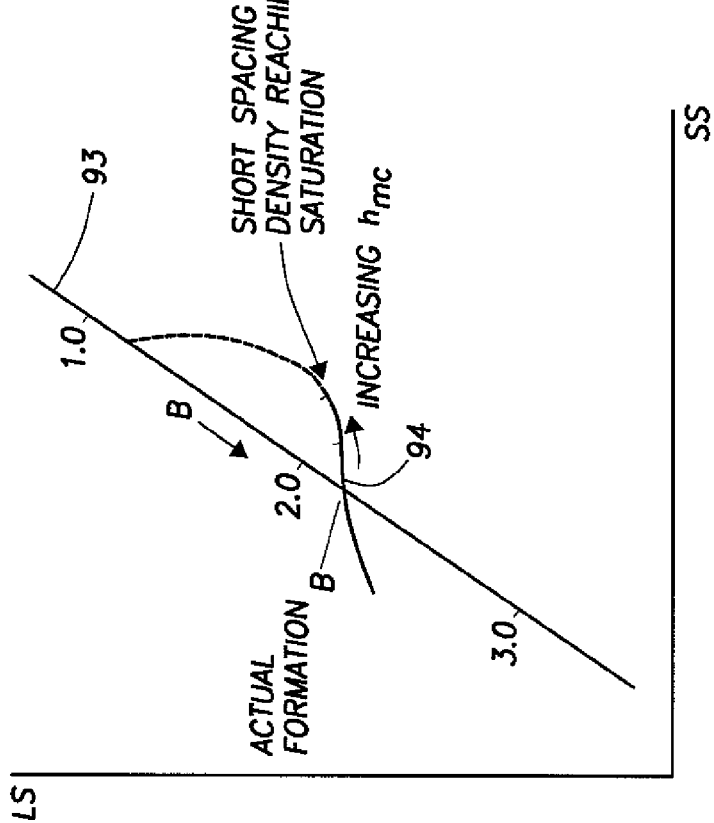

FIG. 5a shows another classic spine and rib plot relative to the present invention. The spine 93 corresponds to a no standoff measurement and the rib 94 shows the effects of standoff on a measurement. Once the rib shape is determined, the formation density can then be extracted from the detector densities by following the rib up to the spine. Referring again to FIG. 5a, as the standoff increases, both the short and long spacing densities decrease and the short spacing density decreases faster as it sees more mud than the long spacing measurement. When standoff reaches the depth of investigation of the short spacing, the near detector spacing density will saturate and read mud density. Once the short spacing saturates, which corresponds on the plot to the section where the rib is parallel to the spine, the solution is not unique as a multitude of ribs will go through the measurement point.

For this case, in order for processing to find a unique solution, the rib used needs to be modified and its angle kept constant above a certain standoff, as shown in FIG. 5b, in order to never be parallel to the spine. This way a unique solution can always be found, but will lead to an under corrected density whenever the standoff is high. In FIG. 5b, the spine and rib used in the processing keeps a constant angle above a certain standoff. This plot illustrates the effect of a high standoff for which the short spacing is saturated. In this plot, a formation is indicated with a density indicated in the spine as "Formation density". Now consider a measurement with a high standoff for which short spacing is saturated at the measurement point. The processing rib going through the measured point is not the one going through the formation density and will result in an under correction and a computed density too low when compared to the formation density.

FIGS. 5a and 5b illustrate the effect of high standoff on a spine and rib plot. As mentioned, this spine and rib technique becomes inaccurate when tool standoff gets too high because the rib shape is very dependent on mud properties and density contrast between mud and formation. The other problem is that as soon as the short spacing reaches saturation when seeing mainly mud, the spine and rib cannot work. The proposed method of the present invention solves this problem by using two corrections:

A spine and rib correction based on apparent density difference between the two detectors A second correction term, which is a function of an apparent standoff measurement PEF (Photo Electric Factor) or any other windows ration or functions giving mainly sensitivity to standoff) and the formation density.

PEF is selected here, but the key point is having a measurement sensitive to standoff. PEF gives a nice linear relationship but any windows ratio mainly sensitive to standoff effect could be used and this method includes it. The spine and rib correction is the one determined from the tool characterization. This correction is accurate for small standoff and this is why it is used.

The second term is very dependant on the mud properties and density contrast between the mud and formation. This one has to be tuned for each mud. In order to do that, the azimuthal density information is used to calibrate the various parameters of this function. When the LWD tool is in rotating mode and in an eccentralized position, which is the case encountered most of the time, the azimuthal density gives access to an apparent density measurement for various standoffs (see FIG. 6). When the LWD tool is off center in the borehole, there is always some sectors for which the standoff is very small and where the classic spine and rib gives excellent correction. Using the density from these sectors as a reference, and using the apparent densities from the other sectors, one can then compute the additional correction (referred in this document as second correction term). A database can then be built up with second correction terms for various formation densities and estimated standoff measurements. FIG. 7 illustrates the type of data obtained using this technique. This database can then be used the same way as a tool characterization to derive a continuous correction function to compute the second correction term. By doing so, one is ensured of having a characterization perfectly fitted to the mud properties, which allow the correction to remain very stable for high standoff. As the second term correction is computed using formation density as one of the input, the processing needs to be iterative (see FIG. 8).

FIG. 6 represents a cross section of the LWD tool in an off centered position in the hole. As shown in the drawing, the bottom/down quadrant is close to the borehole wall. Therefore, the standoff is minimal for the bottom quadrant, but increases for the left and right quadrants, and reaches its maximum for the up or top quadrant. So at a given depth and when the tool is not centered, the various sector or quadrant measurements will see different amount of standoff If the tool is very off centered as in this example, the standoff will be close to zero in one quadrant or sectors. Therefore, the density measurement in this azimuth will be of very high quality and not affected by the mud. This is the reference density at this depth. Assuming that the tool is in a homogeneous formation, all azimuthal densities should read the same value. Any difference with the reference density can therefore be attributed to the effect of standoff This difference is the second term correction need to be applied to the azimuthal density. Therefore, for each azimuth and at a given depth, the second term can be expressed versus the estimated standoff measurement. The same process is repeated at every depth to build up a correction database. This database gives the value of the second term correction versus formation density and apparent standoff measurement.

FIGS. 7a and 7b show plots of the second term correction versus apparent standoff measurement for two different density slices. At each depth where a valid formation density is measured, the second term correction and apparent standoff are measured for all the other azimuths and those measurements are used to build up the database. From this database, one can extract all the ones falling in a given formation density slice. This is what has been done to create those cross plots with the respective formation density slices of 1.95-2.00 g/cc, as shown in FIG. 7A, and 2.20-2.25 g/cc, as shown in FIG. 7B. In each density slice, the correlation between the second term correction and the apparent standoff is very good and a regression function can be suited to fit the data. In this example, a linear function is used. The spread of points around the line tells also how well the function fit the database. The standard deviation is measured and used to build the uncertainty function. Comparing the two cross plots, the dependence on the formation density is clearly seen and shows that the correction is much steeper when formation density increases. The mathematical function to compute the second term correction is a two-dimension function using as input the formation density and the apparent standoff.

FIG. 8 is a flow diagram of the computation of the second correction term. Shown in block 100 are the initial inputs used to calculate this second correction term. These inputs include an apparent density (RHOi). The i character is the sector index. This apparent density is the density of the quadrant with the smallest tool standoff as previously discussed. As only an apparent density is measured, it is necessary to compute the correction based on a formation density estimate (apparent density taken here). Another input in this second term calculation is the tool standoff measurement (SOFFi). The initial formation density (RHOF) is equal to the apparent density. This relationship can be represented by the equation:

$$RHOF = RHOi \tag{1}$$

Block 102 shows the computation of the second correction term and the corrected density computation. The computation of the second term correction uses these initial inputs and is represented by the equation:

$$DRHO2i = f(RHOF, SOFFi) \tag{2}$$

DRHO2i may be computed, for example, by performing a regression analysis on RHOF, SOFFi. Any regression analysis may be used. For example, the regression analysis may be a linear regression analysis or a non-linear (e.g., cubic, quadratic, etc.) regression analysis. RHOcor represents the corrected density computation. The computation of the corrected density is represented by the equation:

$$RHOcori = RHOi + DRHO2i \tag{3}$$

After the application of the computed second correction, block 104 compares the result to the initial guess used. If the result is the same as the initial guess, the process ends in block 106. If the comparison shows that the result is not the same as the initial guess, the process returns to block 102 and an iteration continues until a convergence is reached.

Figure 9:
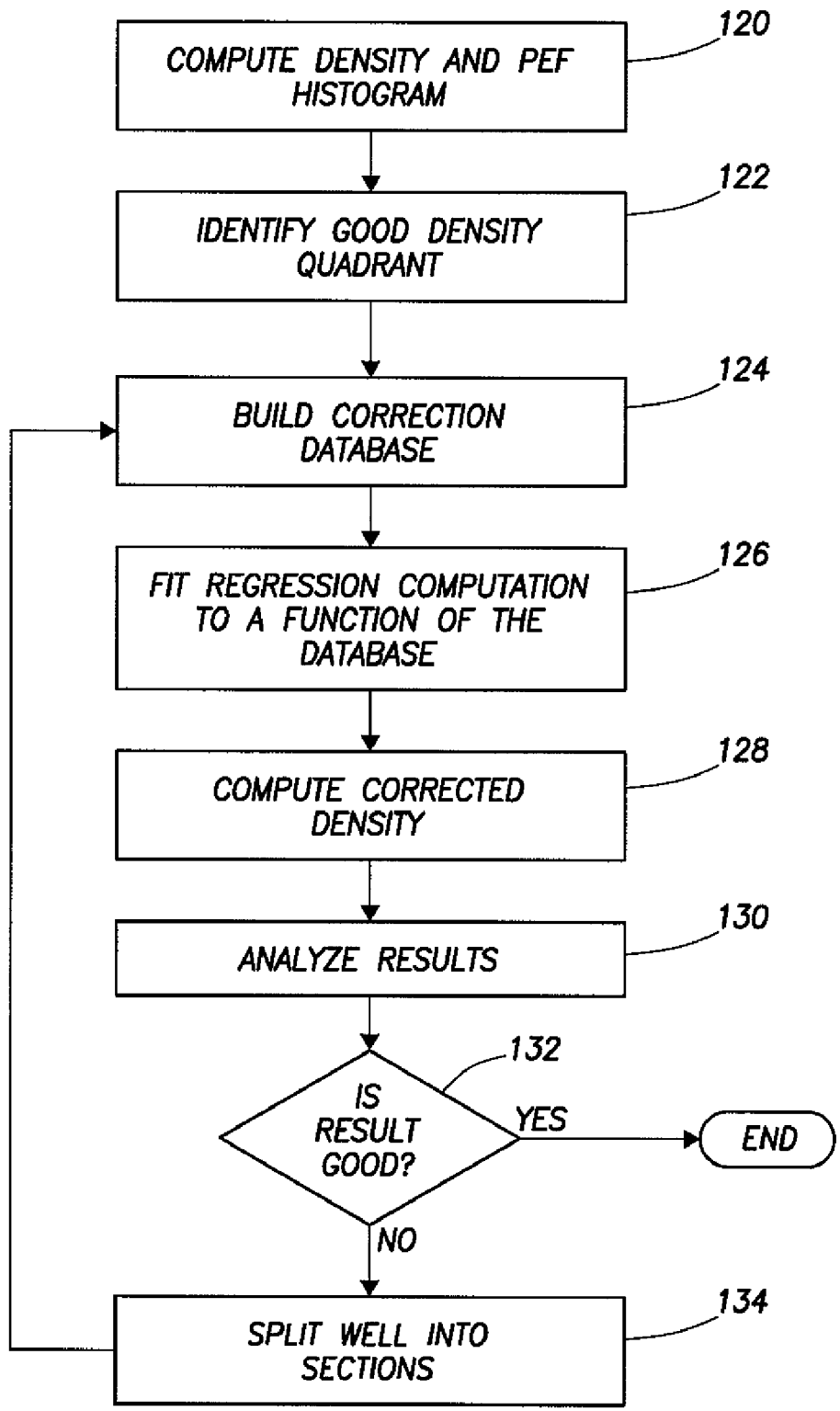
FIG. 9 is a flow diagram of the steps in the formation density correction method of the present invention.

FIG. 9 is a flow diagram of the steps in the formation density correction method of the present invention. Step 120 performs a density and PEF (or other standoff estimation) histogram computation. This computation is needed in order to bin the data properly and determine the range of values for which the corrections need to be built up. Step 122 identifies the zones where there is at least one good azimuthal density (very low standoff zones). Selecting zones with low PEF and low DRHO or any other good indicator measurement does this identification task. This identification step is important as one does not want to include zones where no valid reference density is measured as it would bias the correction function. Azimuthal density can be either one of the up, down, left or right quadrant as well as a quadrant composed of adjacent sectors where the standoff is minimal. Step 124 builds up a correction database with the good quadrant density, apparent density and standoff estimation from other quadrants. This database is only filled up with data from the zones determined in the identification step 122 where a good reference density is available. The data used is the difference between the good density and the other quadrant densities, which is equal to the desired second correction. This second correction term is function of the apparent standoff estimation. There is the option to use the apparent dip to depth shift the azimuthal density in order to use the azimuthal density in the same beds.

Step 126 computes a function to best fit the database. This function will compute the value of the second correction term using the apparent standoff estimation and the formation density as inputs. The standard deviation of the correction is computed during this regression computation. Step 128 computes a corrected density for each sector (image) and each quadrant. This correction computation is done using the correction function previously determined. The computation of the uncertainty of each density is done in the same loop. This is the sum of the standard deviation of the correction and the uncertainty computed by propagating the standoff estimation uncertainty through the correction function.

Step 130 performs an analysis of result. The correction function is highly dependant on the mud properties, and as in most cases the mud properties were changed during the drilling process of a well, the correction function will not be the same for the entire well. Step 132 checks this results. If the result meets the criteria of a good result, the process ends. However, if the result does not meet some criteria, the well is split in sections and processing redone. The process then returns to the database buildup step 124 and repeats steps 126, 128, 130 and 132. The software can do this process automatically. When result is good, the process ends.

The result may be used to compute the porosity of an oil reserve. By obtaining an accurate measurement of the porosity, an accurate reservoir characterization may be obtained, thereby facilitating in obtaining hydrocarbons from a well.

It will be understood from the foregoing description that various modifications and changes may be made in the preferred and alternative embodiments of the present invention without departing from its true spirit. For example, while the sensor is described in at least some aspects as being a pressure sensor, it will be appreciated that any type of sensor may be used, such as temperature, density, flow rate, etc.

This description is intended for purposes of illustration only and should not be construed in a limiting sense. Only the language of the claims that follow should determine the scope of this invention. The term "comprising" within the claims is intended to mean "including at least" such that the recited listing of elements in a claim are an open group. "A," "an" and other singular terms are intended to include the plural forms thereof unless specifically excluded.

I claim:

1. A method for correcting logging while drilling formation density measurements affected by tool standoff comprising the steps of:

determining an initial formation density measurement at a defined formation depth, the initial formation density measurement being equal to an apparent formation density, wherein determining the initial formation density measurement comprises identifying from collected formation data at least one primary density quadrant of a formation at the defined formation depth;

calculating, by a computer, a tool standoff measurement;

after calculating the tool standoff measurement:

computing, by the computer, an initial formation density and photo electric factor (PEF) histogram of the collected formation data, wherein PEF is the photo-electric factor;

identifying at least one good density quadrant from the collected formation data; and building up a correction database with primary quadrant density measurements, apparent density measurements and standoff estimations from other formation quadrants;

calculating, by the computer, a density correction term from the apparent formation density and the tool standoff measurement; and computing, by the computer, a corrected formation density using the density correction term and the apparent formation density.

2. The method as described in claim 1, wherein the calculating the density correction term further comprises a step of obtaining a value for the density correction term versus an apparent standoff estimation using a regression fit computation.

3. The method as described in claim 2, wherein the computing the corrected formation density further comprises computing a corrected formation density for each sector and each quadrant of a formation at a particular borehole depth using the density correction term.

4. The method as described in claim 2, wherein the step of obtaining the value further comprises computing a standard deviation of the density correction term during the regression computation.

5. The method as described in claim 1, further comprising after computing the corrected formation density, the step of analyzing the corrected formation density to determine whether it is necessary to split the collected formation data into well sections to account for mud property changes during drilling.

6. The method as described in claim 1, wherein identifying at least one good quadrant comprises selecting a quadrant with low PEF and low RHO indicator measurements, wherein RHO is the initial formation density measurement.

7. The method as described in claim 1, wherein the density correction term is a function of an apparent standoff estimation.

8. The method as described in claim 7, wherein the density correction term is calculated as a function of the initial formation density measurement and a measured standoff of a selected quadrant.

9. The method as described in claim 8, wherein the corrected formation density is calculated by the equation: $RHOcori = RHOi + DRHO2i$, wherein RHOcori is the corrected formation density, RHOi is the apparent formation density and DRHO2i is the density correction term.

10. The method as described in claim 8, wherein the density correction term is calculated by the equation: $DRO2i = IDRO - RHOi$, wherein DRO2i is the density correction term, IDRO is an image derived density and RHOi is a density at quadrant i.

11. The method as described in claim 1, further comprising after the computing the corrected formation density, analyzing the corrected formation density and determining whether the corrected formation density meets density measurement criteria.

12. The method as described in claim 11, wherein determining whether the corrected formation density meets the density measurement criteria further comprises comparing the corrected formation density to an initial density estimate.

13. The method as described in claim 12, wherein the determining whether the corrected formation density meets the density measurement criteria further comprises performing iterative calculations of the corrected formation density until a convergence of the calculated corrected formation density and the estimated formation density is reached.

14. The method as described in claim 1, wherein the initial formation density determining step uses a spine and rib computation method.

15. The method as described in claim 1, wherein the initial formation density determining step further comprises the step determining a position of a LWD tool in a borehole being drilled by the LWD tool, the determined position being determined relative to the center of the borehole.

16. A computer program product in a computer readable storage medium for correcting logging while drilling formation density measurements affected by tool standoff comprising:

instructions for determining an initial formation density measurement at a defined formation depth, the initial formation density measurement being equal to an apparent formation density, wherein the instructions for determining the initial formation density measurement comprises instructions for identifying from collected formation data at least one primary density quadrant of a formation at the defined formation depth;

instructions for calculating a tool standoff measurement;

after calculating the tool standoff measurement:

instructions for computing an initial formation density and photo electric factor (PEF) histogram of the collected formation data, wherein PEF is the photo-electric factor;

instructions for identifying at least one good density quadrant from the collected formation data; and instructions for building up a correction database with primary quadrant density measurements, apparent density measurements and standoff estimations from other formation quadrants;

instructions for calculating a density correction term from the apparent formation density and tool standoff measurements; and instructions for computing a corrected formation density using the density correction term and the apparent formation density.

17. The computer program product as described in claim 16, comprising instructions for calculating the density correction term using the equation:

$DRHO2i = IDRO - RHOi$, wherein $DRHO2i$ is the density correction term, $IDRO$ is an image derived density and $RHOi$ is a density at quadrant i.

18. The computer program product as described in claim 16, comprising instructions for calculating the corrected formation density using the equation:

$RHOcori = RHOi + DRHO2i$, wherein $RHOcori$ is the corrected formation density, $RHOi$ is the apparent formation density and $DRHO2i$ is the density correction term.

* * * * *